US010614063B2

(12) United States Patent
Schwartz et al.

(10) Patent No.: US 10,614,063 B2
(45) Date of Patent: Apr. 7, 2020

(54) STREAMING RECORDS FROM PARALLEL BATCHED DATABASE ACCESS

(71) Applicant: Microsoft Technology Licensing, LLC., Redmond, WA (US)

(72) Inventors: Joseph Schwartz, Redmond, WA (US); Sergey Y. Galuzo, Woodinville, WA (US); Yue Xu, Redmond, WA (US); Jeffrey Darren Couckuyt, Bothell, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 321 days.

(21) Appl. No.: 15/042,126

(22) Filed: Feb. 11, 2016

(65) Prior Publication Data

US 2017/0097958 A1 Apr. 6, 2017

Related U.S. Application Data

(60) Provisional application No. 62/236,095, filed on Oct. 1, 2015.

(51) Int. Cl.
*G06F 16/2453* (2019.01)
*G06F 16/2455* (2019.01)
*G06F 16/245* (2019.01)

(52) U.S. Cl.
CPC ...... *G06F 16/24532* (2019.01); *G06F 16/245* (2019.01); *G06F 16/24568* (2019.01)

(58) Field of Classification Search
CPC ......... G06F 17/30445; G06F 17/30516; G06F 16/24532; G06F 16/24568; G06F 16/245
See application file for complete search history.

(56) References Cited

U.S. PATENT DOCUMENTS

| 6,691,101 | B2 | 2/2004 | MacNicol et al. |
| 8,032,885 | B2 | 10/2011 | Fish |
| 8,209,284 | B1 | 6/2012 | Bozkaya et al. |
| 8,886,631 | B2 | 11/2014 | Abadi et al. |
| 9,679,012 | B1* | 6/2017 | Dorin ................ G06F 16/24545 |
| 2003/0229640 | A1* | 12/2003 | Carlson ............ G06F 16/24553 |
| 2004/0148420 | A1* | 7/2004 | Hinshaw ............... G06F 16/273 |
| | | | 709/231 |

(Continued)

FOREIGN PATENT DOCUMENTS

WO 2014033724 A1 3/2014

OTHER PUBLICATIONS

Carbone, P., Katsifodimos, A., Ewen, S., Markl, V., Haridi, S. et al. (2015) Apache flink: Stream and batch processing in a single engine. Bulletin of the IEEE Computer Society Technical Committee on Data Engineering, 36(4) (Year: 2015).*

(Continued)

*Primary Examiner* — Jesse P Frumkin

(57) ABSTRACT

Retrieving data records from a database is provided. A query is received by a database access API requesting a number of data records stored in the database. A parallel batch processor is created for data transmittal, and the parallel batch processor is returned to a client program. A next data record responsive to the query is requested, and the next data record is removed from a list of records. The next data record is then provided from the parallel batch processor to the client program.

20 Claims, 7 Drawing Sheets

(56) References Cited

U.S. PATENT DOCUMENTS

| | | | |
|---|---|---|---|
| 2005/0021745 A1 | 1/2005 | Bookman et al. | |
| 2005/0049996 A1* | 3/2005 | Srinivasan | G06F 16/83 |
| 2005/0240559 A1 | 10/2005 | Ng et al. | |
| 2009/0228434 A1* | 9/2009 | Krishnamurthy | G06F 17/30445 |
| 2009/0319497 A1* | 12/2009 | Bolognese | G06F 9/547 |
| 2010/0198855 A1 | 8/2010 | Ranganathan et al. | |
| 2010/0250572 A1* | 9/2010 | Chen | G06F 17/3051 707/759 |
| 2011/0252426 A1* | 10/2011 | Antani | G06F 9/522 718/101 |
| 2011/0314019 A1* | 12/2011 | Jimenez Peris | G06F 9/5066 707/737 |
| 2012/0023369 A1* | 1/2012 | Bourbonnais | G06F 11/1474 714/16 |
| 2012/0117075 A1* | 5/2012 | Gokulakannan | G06F 17/30445 707/741 |
| 2013/0191413 A1 | 7/2013 | Chen et al. | |
| 2013/0275452 A1* | 10/2013 | Krishnamurthy | G06F 17/30445 707/764 |
| 2014/0229506 A1 | 8/2014 | Lee | |
| 2014/0297809 A1* | 10/2014 | Kim | G06F 16/903 709/219 |
| 2015/0286641 A1* | 10/2015 | Barroso | G06F 16/2386 707/609 |
| 2015/0356131 A1* | 12/2015 | McClary | G06F 17/30339 707/769 |
| 2016/0232251 A1* | 8/2016 | Dong | H04L 67/10 |
| 2016/0306857 A1* | 10/2016 | Barsness | G06F 17/30442 |
| 2016/0342658 A1* | 11/2016 | Skrzypczak | G06F 17/30516 |
| 2017/0004020 A1* | 1/2017 | Chen | G06F 9/541 |
| 2017/0011090 A1* | 1/2017 | Chen | G06F 17/30445 |
| 2017/0075721 A1* | 3/2017 | Bishop | G06F 9/4881 |

OTHER PUBLICATIONS

"Data Engineering Bulletin," Web page http://sites.computer.org/debull/A15dec/issue1.htm, 1 page, retrieved from the Internet on Nov. 14, 2019. (Year: 2015).*

"Second Written Opinion Issued in PCT Application No. PCT/US2016/053642", dated Oct. 16, 2017, 9 Pages.

Jendrock et al., "Batch Processing", In Book Java EE 7 Tutorial, 5th Edition, Published by Addison-Wesley Professional, May 2014, 36 Pages.

Mullie, Matthias, "Parallel processing or multitasking in PHP", Retrieved from <<https://web.archive.org/web/20140704071547/http://www.mullie.eu/parallel-processing-multi-tasking-php>>, Jul. 5, 2013, 5 Pages.

Nagle, Ryan, "Batch Processing Data With WordPress via HTTP", retrieved from <<https://nerds.inn.org/2014/11/07/batch-processing-data-with-wordpress-via-http/>>, Nov. 7, 2014, 3 Pages.

"International Search Report and Written Opinion Issued in PCT Application No. PCT/US2016/053642", dated Dec. 19, 2016, 14 Pages.

Sanderson, Adam, "Reading Rails—How Do Batched Queries Work?", Retrieved from <<http://www.monkeyandcrow.com/blog/reading_rails_how_do_batched_queries_work/>>, May 5, 2014, 4 Pages.

"Data Service Layer Query Processing", Published on: Oct. 30, 2014 Available at: http://www-01.ibm.com/support/knowledgecenter/SSZLC2_7.0.0/com.ibm.commerce.developer.soa.doc/concepts/csdqueryexec.htm.

"Amazon Kinesis Developer Guide Benefits of Using Amazon Kinesis", Published on: Dec. 2, 2013 Available at: http://awsdocs.s3.amazonaws.com/kinesis/latest/kinesis-dg.pdf.

Higa, Sidney, "Azure SQL Database Elastic Database Query (Preview) Overview", Retrieved on: Sep. 28, 2015 Available at: https://azure.microsoft.com/en-in/documentation/articles/sql-database-elastic-query-overview/#elastic-database-query-scenarios.

Katsov, Ilya, "In-Stream Big Data Processing", Published on: Aug. 20, 2013 Available at: https://highlyscalable.wordpress.com/2013/08/20/in-stream-big-data-processing/.

"International Preliminary Report on Patentability Issued in PCT Application No. PCT/USS2016/053642", dated Jan. 29, 2018, 10 Pages.

* cited by examiner

STREAMING RECORDS FROM PARALLEL BATCHED DATABASE ACCESS

CROSS-REFERENCE TO RELATED APPLICATIONS

This application claims priority from U.S. Provisional Application No. 62/236,095, filed Oct. 1, 2015, and entitled "Streaming Records From Parallel Batched Database Access," which is herein incorporated by reference.

BACKGROUND

When reading records from a database, the individually read database records may be treated as a stream. The stream of retrieved database records may be processed one after another in sequence such that a single record must be fully processed before the next record begins processing. Such stream data record processing requires the database application to maintain a long connection to the database. This consumes great amounts of server resources. Alternatively, such stream data record processing may require a client to read all of the desired data records prior to processing them. This consumes great amounts of client resources. Present systems may not provide an efficient stream processing interface to perform multiple parallel database queries.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Aspects of systems and methods are provided herein for retrieving data records from a database. A query is transmitted to (and received by) a database access application program interface (API) requesting a number of data records stored in a database. A parallel batch processor is created for data transmittal, and is returned to a client program. A next data record responsive to the query is requested, and the next data record is removed from a list of records. The next data record is then provided from the parallel batch processor to the client program.

The details of one or more aspects are set forth in the accompanying drawings and description below. Other features and advantages will be apparent from a reading of the following detailed description and a review of the associated drawings.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout several views.

DETAILED DESCRIPTION

Figure 1:
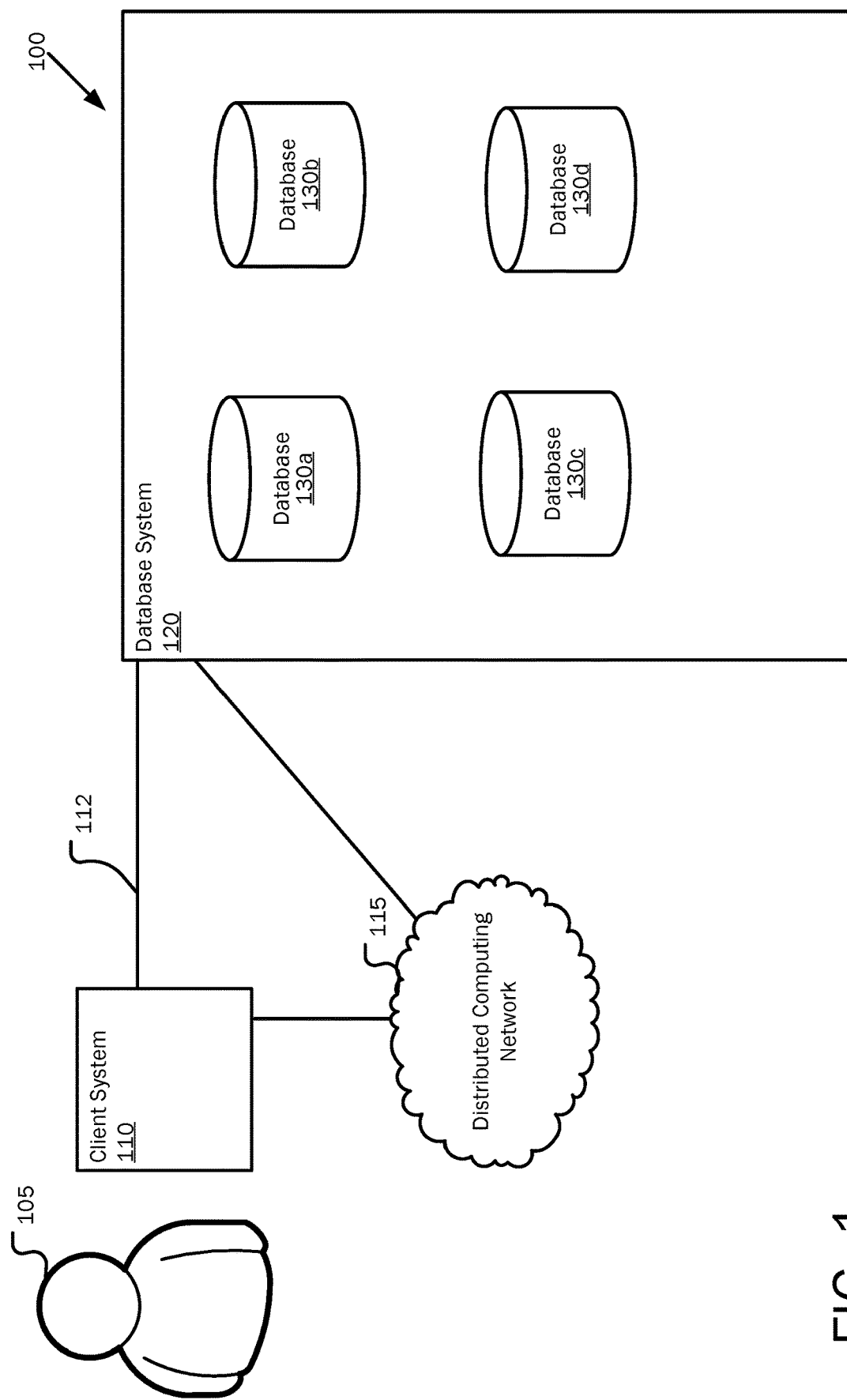
FIG. 1 is a block diagram illustrating a system for providing a stream processing interface for multiple database queries in a database system.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is non-limiting, and instead, the proper scope is defined by the appended claims. Examples may take the form of a hardware implementation, or an entirely software implementation, or an implementation combining software and hardware aspects. The following detailed description is, therefore, not to be taken in a limiting sense.

For purposes of illustration and understanding, aspects disclosed herein are discussed with reference to providing a stream processing interface for multiple database queries in a database system. As will be appreciated from the disclosure set out herein, aspects of the present disclosure are useful with respect to database systems wherein small batches of database records may be read in response to multiple parallel database queries. Specifically, a list of primary keys may be retrieved in response to a database query. Simultaneously with receiving the list of primary keys, multiple queries may be sent in parallel to retrieve small batches of data records matching the primary keys. The retrieved data record batches may be added to a data record list, and the data record list may be returned when the client requests the next record from the stream interface.

In some database systems, when an application wants to retrieve data from a database, a query is made and the database will return the requested data using an interface that provides streaming access. In other words, the application will request the data and the database will return the desired records one record at a time. The client program may then process each record and then, upon completion of processing one data record, will advance to processing the next record. However, if the client program needs to take a long time to process each record, the requested stream of data records will have to be maintained as an open stream for a relatively long time. While that stream is kept open, the database server must use its limited resources. This may create issues as the database server has a finite amount of resources, both in terms of disk space and central processing unit (CPU) resources available for making service requests. It is preferred if the client program can process results quickly, and thereby preserve server resources.

One alternative to processing the records as they are retrieved from the stream, when, for example, client processing is going to take a long time, is to read all the data records quickly and store them on client devices for later processing, which frees up the resources of the database server while the client is processing those records. The downside to this approach is that it requires more local storage on the client devices to store all of the received data records. This becomes especially troublesome in the context of mapping applications. For example, a user may make a data query for the geographical data records representing all of the roads in the United States. The number of data records returned may contain more data than the client device can hold in memory at once. Aspects of the present disclosure balance the need to free up server resources with the need to minimize the use of memory on the client devices.

Aspects of the present disclosure also maintain a streaming interface so that, as far as the client program knows, the data records are still being fed to the client devices one record at a time. In other words, no modifications may be needed on the client side to effectuate aspects of the present disclosure. A streaming interface may then be maintained where the client program does not need to do anything outside of normal operation to retrieve the data records, while minimizing the use of client device memory.

Referring now to the drawings, FIG. 1 is a block diagram illustrating a system 100 for performing data record retrieval by a client system 110 from a database system 120 according to aspects of the present disclosure. As illustrated in FIG. 1, a user, such as user 105, may interact with a client system 110 in communication with a database system 120 via a direct data link 112 or via a distributed computing network 115, such as the Internet or an intranet, operated by a corporation or other entity. The database system 120 is illustrative of a collection of computer systems at which distributed database coordination may be applied. The distributed database system 120 may comprise one or more databases, such as databases 130a to 130d. Databases 130a to 130d may each be located remotely from one another. Each database may contain a number of data records.

As should be appreciated, the database system 120 may be illustrative of one or more computing systems operating together as a backend data storage system for a company, educational system, or other entity, or the distributed database system 120 may be illustrative of one or more computers or collections of computers operating in a cloud-based data center at which data records may be stored and retrieved. Databases 130a to 130d may be illustrative of general purpose data storage units or a system for storage of data records sent by, accessed by, or otherwise communicated to or from the client system 110 in association with storing and retrieving data records.

The client system 110, the database system 120, and the databases 130a to 130d are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

According to aspects, the components of the database system 120 are illustrated and described above as a system of components operating remotely from the client system 110. That is, the components of the database system 120 may operate as a standalone system of computing devices that may be called upon by the client system 110 for, or in association with, data record retrieval as described herein. For example, the database system 120 could be a single database, or it could be multiple databases capable of providing data records into a streaming interface.

Figure 2:
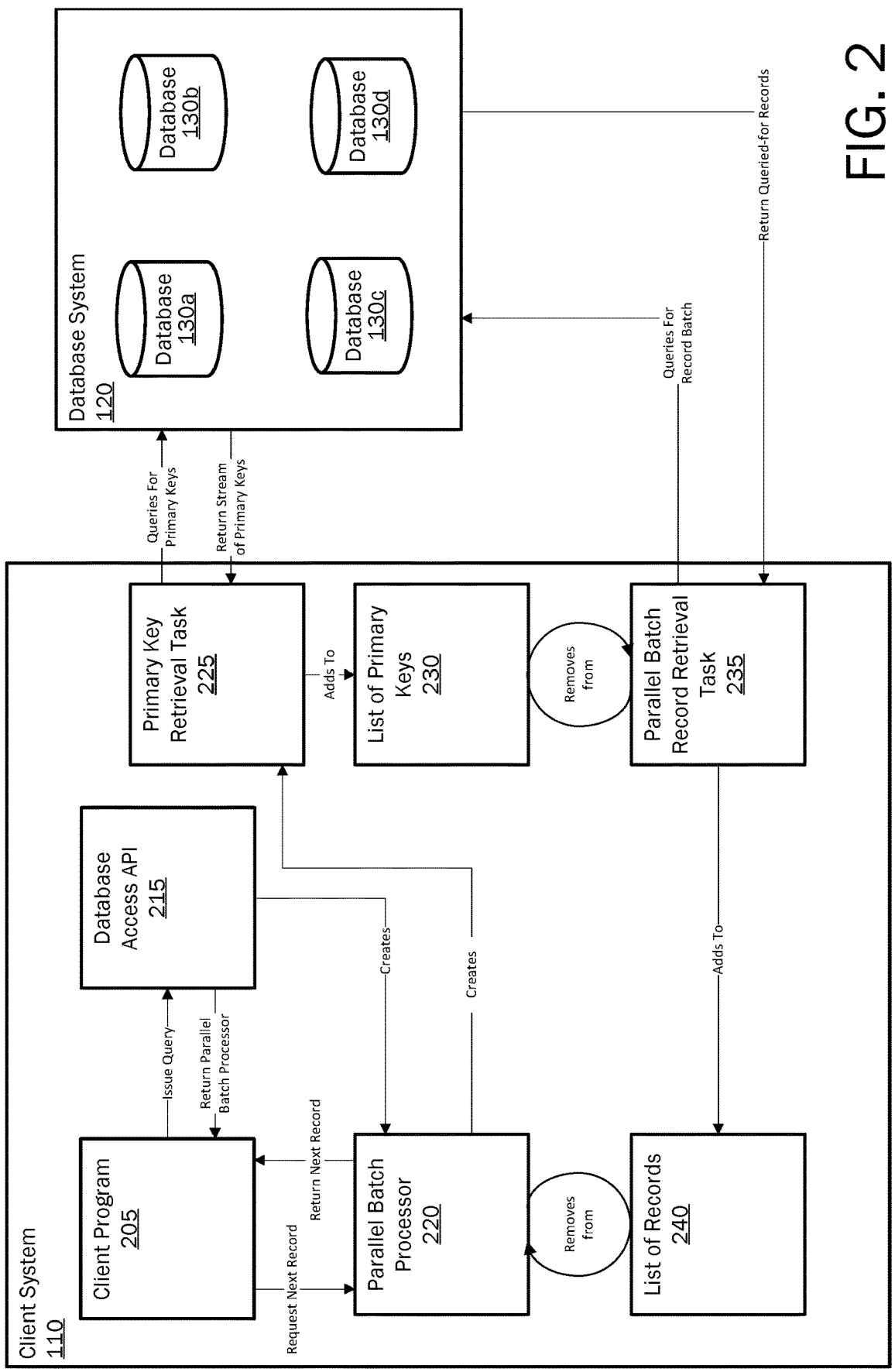
FIG. 2 is a block diagram illustrating a system for providing a stream processing interface for multiple database queries in a database system.

Referring again to the drawings, FIG. 2 is a block diagram illustrating a system 200 for performing data record retrieval by the client system 110 from a database system 120 according to aspects of the present disclosure. A client program 205 is illustrated with which a user 105 may operate a variety of software applications for reading information from a database, such as database system 120. The client program 205 may query a database access application program interface (API) 215 for retrieval of data records. For example, the client program 205 may issue a query to return all roads in the United States for use in a mapping application. In aspects, the database access API 215 may represent a public API that interacts with the client program 205. As a result, the components in FIG. 2, other than the database access API 215, are hidden from the client program 205.

Referring back to the example, the client program 205 may have a particular query that it wants to issue to the database system 120. The client program 205 issues that query to the database access API 215. Next, the database access API 215 internally creates a parallel batch processor 220 and returns that object to the client program 205. The returned object may be defined by standard .NET libraries. Such .NET libraries allow the client program 205 to ask for each data element in a list one at a time.

From the perspective of the client program 205, it will sequentially request the next record over and over until all the records are returned. However, in aspects of the present disclosure, the parallel batch processor 220 creates two sets of tasks behind the scenes. One such task is a primary key retrieval task 225. The primary key retrieval task 225 operates to retrieve all primary keys needed to locate data records that satisfy the query. For example, if the query is requesting all roads in the United States, there may exist one hundred million records that satisfy the query. As such, the primary key retrieval task 225 will request all one hundred million primary keys from the database system 120. Each primary key will correspond to a responsive data record and may be used to look up the full data record from the database system 120.

The primary key retrieval task 225 may have a stream interface to the database system 120. The database system 120 responds to the primary key retrieval task 225 by providing back a stream of primary keys. The primary key retrieval task 225 reads those primary keys, and subsequently adds them to an internal list of primary keys 230. In aspects of the present disclosure, the primary key retrieval task 225 may retrieve primary keys in groups. For example, a batch size may be set to one thousand data records. As such, the primary key retrieval task 225 may retrieve groups of one thousand primary keys at a time. Batch sizes may be predetermined by the database system 120.

A parallel batch record retrieval task 235 will look for those batches of primary keys as they are added to the list of primary keys 230. For example, as each group is added to the list of primary keys 230, the parallel batch record retrieval task 235 will remove the group from the list of primary keys 230, and it will then make a new query to the database system 120 requesting the data records corresponding to this group of primary keys.

As the parallel batch record retrieval task 235 receives those records back from the database system 120, the parallel batch record retrieval task 235 subsequently adds those records to a list of records 240. In aspects of the present disclosure, the primary key retrieval task 225 may be constantly adding primary keys to the list of primary keys

230. The primary key additions will continue until all the primary keys that the database system 120 returned are consumed.

The parallel batch record retrieval task 235 is constantly removing primary keys from the list of primary keys 230 and requesting the corresponding database records from the database system 120. As the parallel batch record retrieval task 235 receives those data records, it adds them into the list of records 240. Meanwhile, the client program 205 is consuming data records from the list of records 240 as it requests them from its stream interface. For example, once the client program 205 indicates to the parallel batch processor 220 that it is finished with one data record, the client program 205 then requests the next record. The parallel batch processor 220 then looks to see if there are more data records waiting for it in the list of records 240. If there are more data records waiting, then the parallel batch processor 220 removes the next data record to the list of records 240 and, in turn, returns the data record to the client program 205. This process may continue until there are no more primary keys to be retrieved from the database system 120 and there are no more records to be retrieved from the database. After there are no more primary keys to be retrieved, and all the primary keys in the list of primary keys 230 have been requested from the database system 120 and turned into data records retrieved by the client program 205, the retrieval process is complete.

Figure 3:
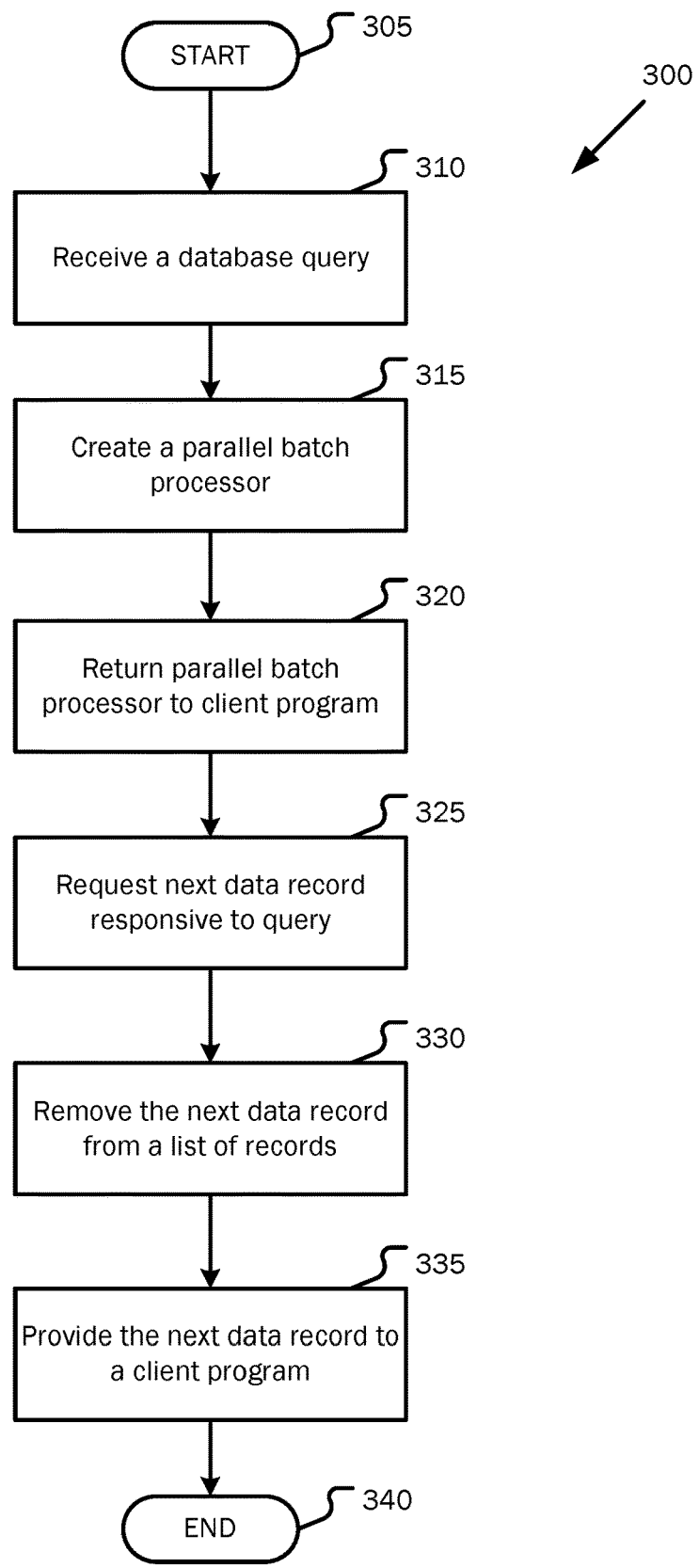
FIG. 3 is a flowchart showing general stages involved in an example method for providing a stream processing interface for multiple database queries in a database system.

Having described an example architecture and other aspects of the present disclosure above with reference to FIG. 1 and FIG. 2, FIG. 3 is a flowchart showing general stages involved in an example method 300 for retrieving data from a database system 120. For purposes of description, the operations set out below are described in terms of updating a database system 120 comprising data records, but the description of these aspects with respect to the particular database system 120 should not be taken as limiting but for purposes of illustration and description only.

Referring then to FIG. 3, the method 300 begins at start operation 305 and proceeds to operation 310 where a particular user, such as user 105, may issue a query to the database access API 215 requesting a number of data records stored in database system 120. At operation 315, the database access API 215 creates a parallel batch processor 220, creating a public API for data transmittal as discussed above.

At operation 320, the parallel batch processor 220 is returned to the client program 205. In some aspects, the parallel batch processor 220 may retrieve a list of primary keys in response to the query. Next, at operation 325, the client program 205 requests a next data record responsive to the query. In response, at operation 330, the parallel batch processor 220 removes the next data record from the list of records 240. At operation 335, the removed data record is provided from the parallel batch processor 220 to the client program 205. In some aspects, multiple queries may be simultaneously sent in parallel to retrieve small batches of data records matching the primary keys.

The method 300 may repeat until all records have been provided to the client program 205. The method 300 may conclude at end operation 340. In some aspects, a streaming interface may be maintained so that, as far as the client program 205 knows, the data records are still being fed to the client devices one record at a time. In aspects, the retrieved small batches of data records may be added to the list of records 240. Accordingly, the list of records 240 may be returned when the next data record is requested.

Figure 4:
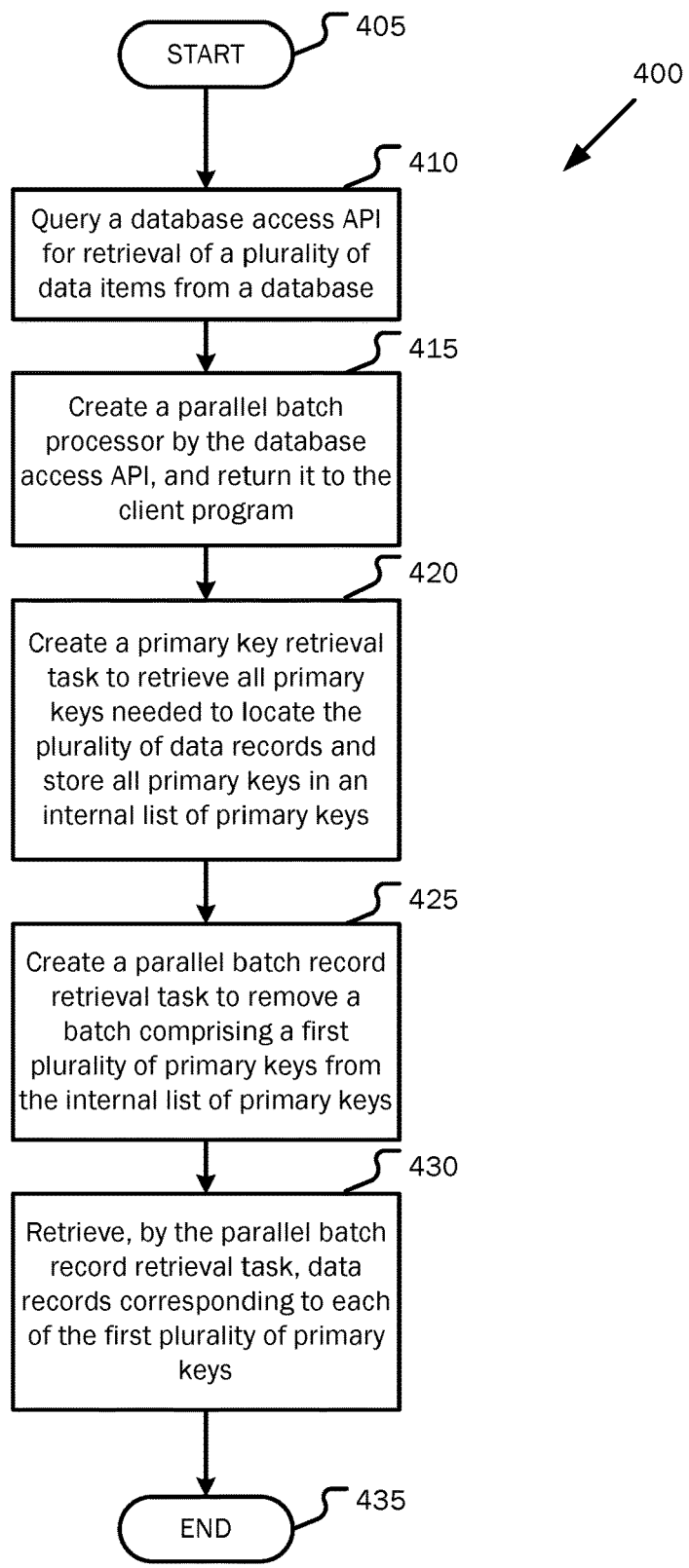
FIG. 4 is a flowchart showing general stages involved in an example method for providing a stream processing interface for multiple database queries in a database system.

FIG. 4 is a flowchart showing general stages involved in an example method 400 for retrieving data from a database system 120. For purposes of description, the operations set out below are described in terms of updating a database system 120 comprising data records, but the description of these aspects with respect to the particular database system 120 should not be taken as limiting but for purposes of illustration and description only.

Referring then to FIG. 4, the method 400 begins at start operation 405 and proceeds to operation 410 where a database access API 215 is queried for retrieval of a plurality of data records from a database. In some aspects, the database may be a distributed database system 120. Next, at operation 415 a parallel batch processor 220 is created by the database access API 215 and returned to the client program 205.

Next, at operation 420, a primary key retrieval task 225 is created to retrieve all primary keys needed to locate the plurality of data records and store all primary keys in an internal list of primary keys 230.

Method 400 then proceeds to operation 425. At operation 425, a parallel batch record retrieval task 235 is created to remove a batch comprising a first plurality of primary keys from the internal list of primary keys 230. In some aspects, the parallel batch record retrieval task 235 removes additional batches comprising pluralities of primary keys from the internal list of primary keys 230 until all primary keys have been removed. In aspects, the size of the batch may be predetermined by the database.

Next, at operation 430, data records corresponding to each of the first plurality of primary keys are retrieved by the parallel batch record retrieval task 235. In some aspects, the retrieved data records are added to a list of records 240 for access by a client program 205. The method 400 may repeat until all records have been provided to the client program 205. The method 400 may conclude at end operation 435.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. Interaction with the multitude of computing systems with which implementations may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
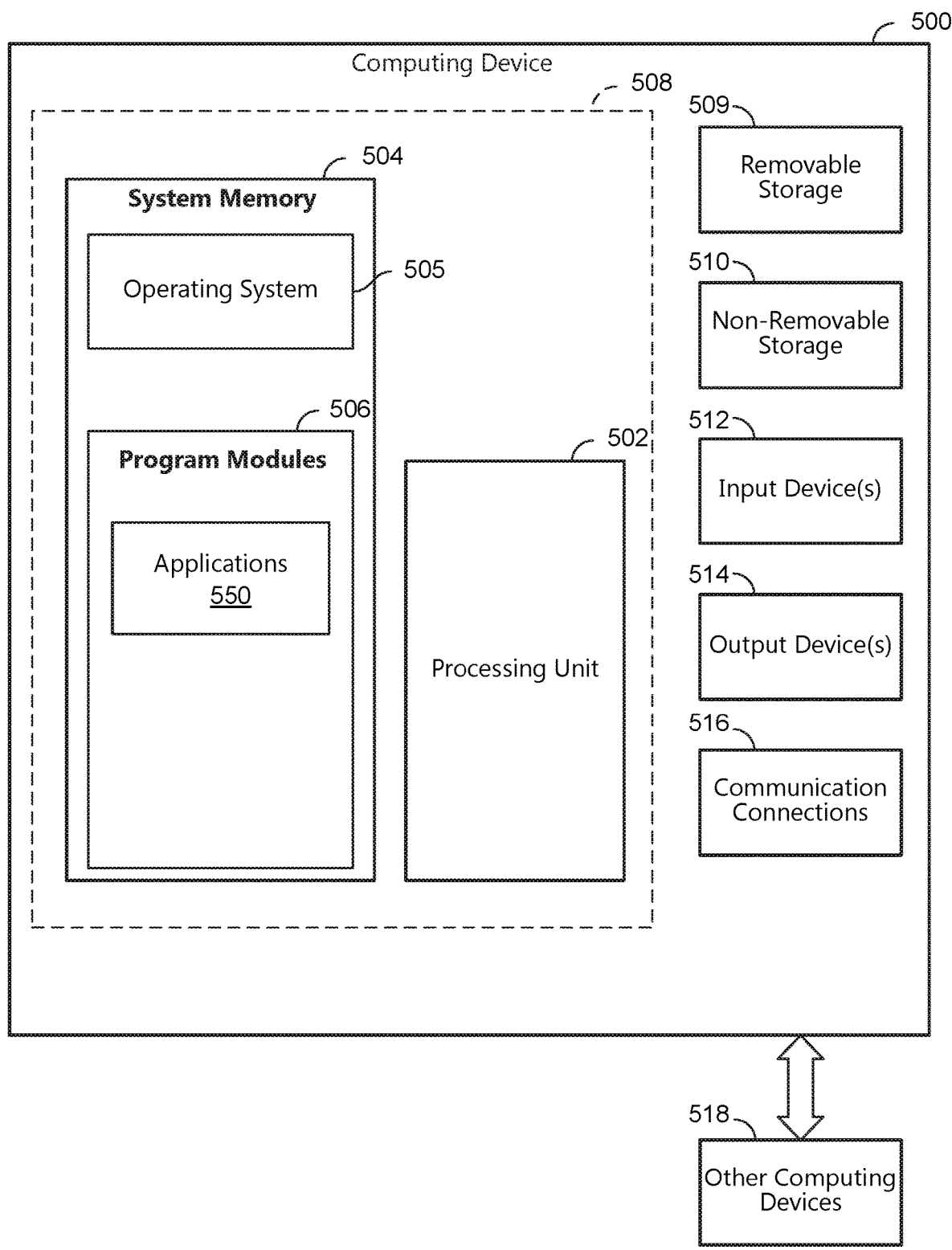
FIG. 5 is a block diagram illustrating one example of the physical components of a computing device.
Figure 6A:
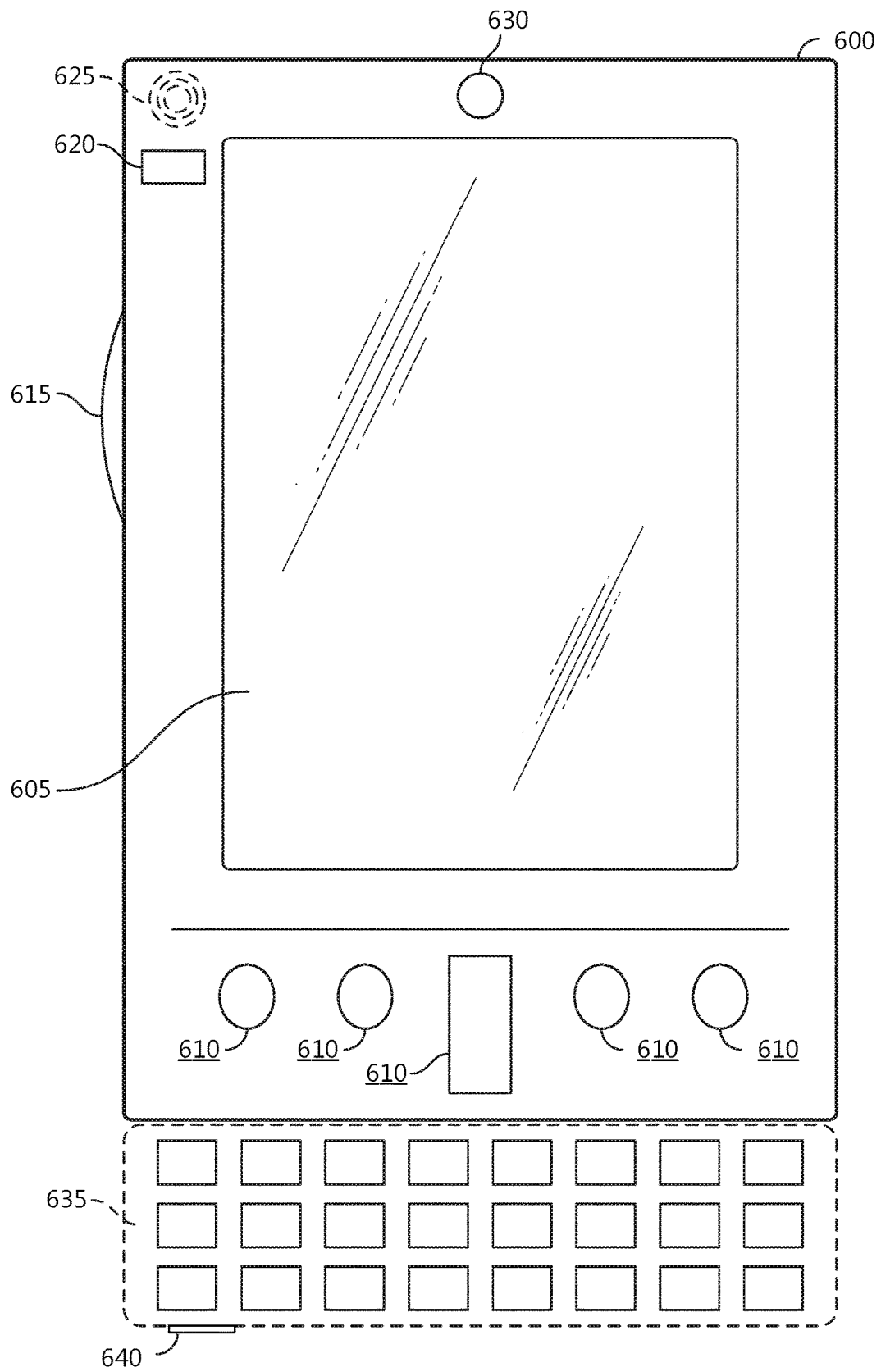
FIGS. 6A and 6B are block diagrams of a mobile computing device.
Figure 6B:
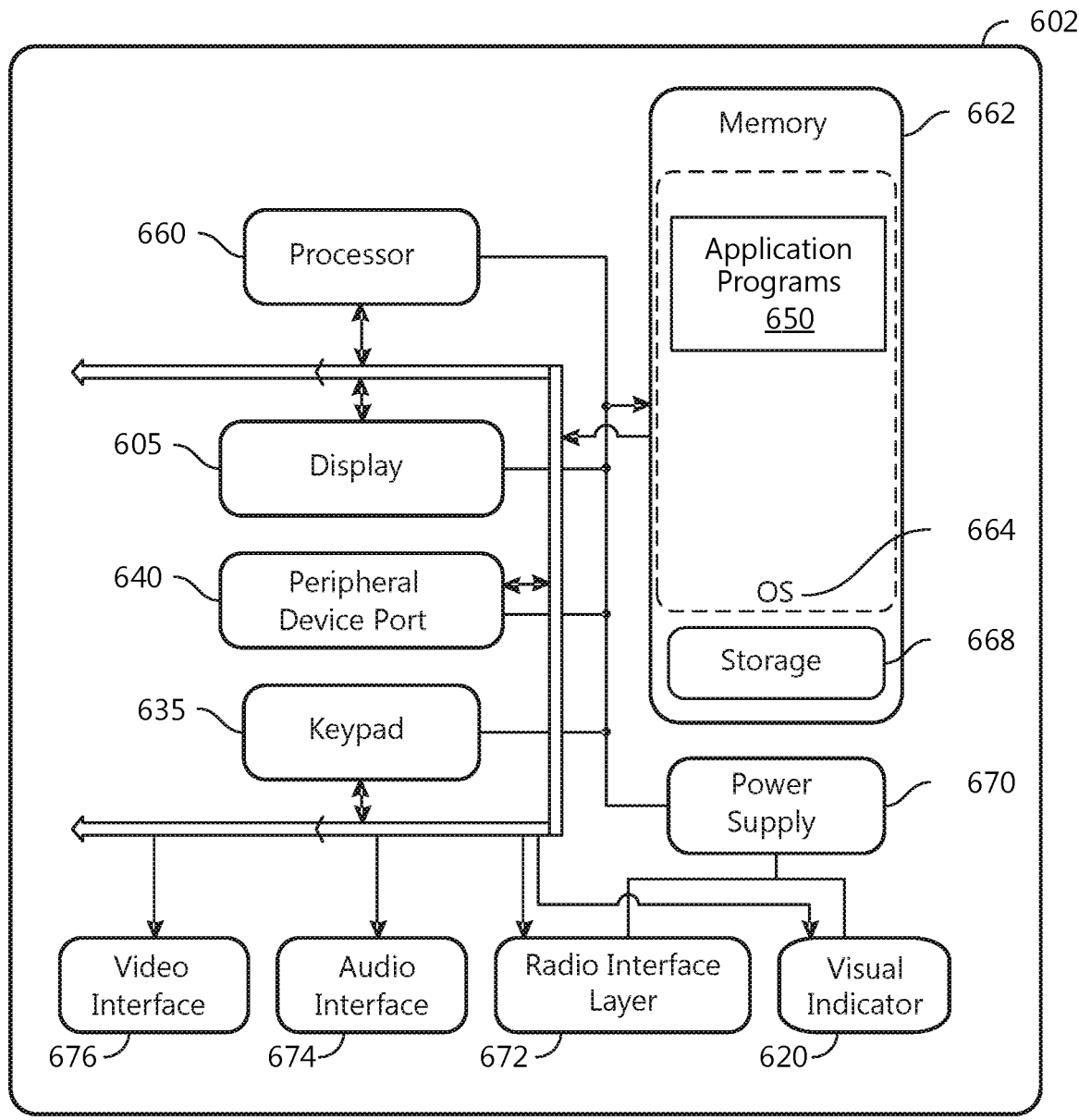

FIGS. 5, 6A, and 6B and the associated descriptions provide a discussion of a variety of operating environments in which aspects of the present disclosure are practiced. However, the devices and systems illustrated and discussed with respect to FIGS. 5, 6A, and 6B are for purposes of example and illustration and are not limiting of a vast number of computing device configurations that are used for practicing aspects, described herein.

FIG. 5 is a block diagram illustrating physical components (i.e., hardware) of a computing device 500 with which examples of the present disclosure can be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes the software for retrieving data records from a database system 120. The operating system 505, for example, is suitable for controlling the operation of the computing device 500. Furthermore, aspects are practiced in conjunction with a graphics library, other operating systems, or any other application program, and are not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., software for retrieving data records from a database system 120) perform processes including, but not limited to, one or more of the stages of the methods 300 or 400 illustrated in FIGS. 3 and 4, respectively. According to an aspect, other program modules may be used in accordance with examples of the present disclosure and include applications such as electronic mail and contacts applications, word processing applications, spreadsheet applications, database applications, slide presentation applications, drawing or computer-aided application programs, etc.

Aspects of the present disclosure are practiced in an electrical circuit comprising discrete electronic elements, packaged or integrated electronic chips containing logic gates, a circuit using a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to: RF transmitter, receiver, and/or transceiver circuitry; universal serial bus (USB), parallel, and/or serial ports.

The term computer readable media as used herein includes computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media or transmission media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or fewer input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates a peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, software for retrieving data records from a database system 120 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 are stored locally on the mobile computing device 600, as described above. According to another aspect, the data are stored on any number of storage media that are accessible by the device via the radio 672 or via a wired connection between the mobile computing device 600 and a separate computing device associated with the mobile computing device 600, for example, a server computer in a distributed computing network, such as the Internet. As should be appreciated, such data/information are accessible via the mobile computing device 600 via the radio 672 or via a distributed computing network. Similarly, according to an aspect, such data/information are readily transferred between computing devices for storage and use according to well-known data/information transfer and storage means, including electronic mail and collaborative data/information sharing systems.

Aspects of the present disclosure, for example, are described above with reference to block diagrams and/or operational illustrations of methods, systems, and computer program products. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope of the present disclosure as claimed in any way. The aspects, examples, and details provided in this application are considered sufficient to convey possession and enable others to make and use the best mode claimed. The present disclosure should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the present disclosure.

We claim:

1. A method with improved efficiency for retrieving data records from a remote database, comprising:
   receiving a query, from a client program executing on a client system, to a remote database access application programming interface (API) requesting a plurality of data records stored in the remote database, wherein the remote database access API executes on the client system to access a remote database system;
   the remote database access API creating a parallel batch processor for data transmittal from the remote database to the client program, wherein the parallel batch processor is an executable object that executes on the client system;
   the remote database access API returning the parallel batch processor to the client program, wherein the parallel batch processor creates an interface with the remote database, wherein the parallel batch processor receives batch data records, and wherein the parallel batch processor serially provides the data records to the client program;
   the client program requesting, from the parallel batch processor, a next data record responsive to the query;
   the parallel batch processor directing the following:
      sending multiple queries, in parallel, to retrieve a batch of data records from the remote database;
      in response to the multiple queries, receiving the batch of data records from the remote database;
      adding the batch of data records to a list of records at the client system;
      receiving the request from the client program for a next data record;
      in response to the request, removing the next data record from the list of records; and
      contemporaneously with adding the batch of data records to the list of records, the parallel batch processor providing the next data record from the parallel batch processor to the client program.

2. The method of claim 1, further comprising:
   retrieving a list of primary keys in response to the query, wherein the batch of data records match at least a portion of primary keys in the list of primary keys, and wherein a size of the batches of data records is specified by the remote database.

3. The method of claim 2, further comprising:
   adding the retrieved batches of data records to a data record list; and
   returning the data record list when the next data record is requested.

4. The method of claim 1, further comprising:
   maintaining a streaming interface to present to the client program data records one record at a time.

5. A client system with improved efficiency for retrieving data records from a remote database comprising:
   a memory storing instruction thereon;
   a processor, in communication with the memory, wherein, when executing the instructions causes the processor to execute:
      a client program that queries a remote database access application programming interface (API) for retrieval of a plurality of data records from the remote database, wherein the remote database access API executes on the client system to access a remote database system;
      a parallel batch processor, created by the remote database access API, and returned to the client program, wherein the parallel batch processor implements a streaming interface between a client device and the remote database for data transmittal from the remote database to the client program, wherein the parallel batch processor is an executable object that executes on the client system;
      wherein the parallel batch processor further:
         creates a primary key retrieval task on the client system, wherein the primary key retrieval task retrieves primary keys;
         creates a parallel batch record retrieval task on the client system, wherein the parallel batch record retrieval task:
            sends multiple queries, in parallel, to retrieve a batch of data records from the remote database;
            in response to the multiple queries, receives the batch of data records from the plurality of data records;
            adds the batch of data records to a list of records at the client system;
            receives a request from the client program for a data record; and
            in response to the request, provides serially the data record to the streamlining interface.

6. The system of claim 5, wherein the parallel batch processor is defined by one or more programming infrastructure libraries that allow the client program to request each data record of the plurality of data records one at a time.

7. The system of claim 5, wherein the primary key retrieval task retrieves all primary keys needed to locate the plurality of data records in the remote database and store all of the primary keys in an internal list of primary keys.

8. The system of claim 7, wherein each primary key corresponds to a unique data record.

9. The system of claim 7, wherein the parallel batch record retrieval task:
   removes a batch, comprising a first plurality of primary keys, from the internal list of primary keys;
   retrieves data records corresponding to each of the first plurality of primary keys from the remote database based on the list of primary keys; and
   adds the retrieved data records to a list of records, on the client system.

10. The system of claim 9, wherein the primary key retrieval task and the parallel batch record retrieval task are operating simultaneously until all of the primary keys are removed from the internal list of primary keys.

11. The system of claim 9, wherein a size of the batch is predetermined by the remote database.

12. The system of claim 9, wherein the client program further retrieves the plurality of data records from the list of records by requesting the data records one at a time.

13. The system of claim 9, wherein the parallel batch retrieval task further removes a second batch, comprising a second plurality of primary keys, from the internal list of primary keys after the retrieved data records from the batch have been added to the list of records.

14. A method with improved efficiency for retrieving data records from a remote database, comprising:

querying, from a client program via a remote database access application programming interface (API), for retrieval of a plurality of data records from the remote database;

creating, by the remote database access API, a parallel batch processor for data transmittal from the remote database to the client program, wherein the parallel batch processor is an executable object executes on the client system;

in response to the query from the client program, returning the parallel batch processor to the client program;

the parallel batch processor creating a primary key retrieval task to retrieve all primary keys needed to locate the plurality of data records in the remote database;

the primary key retrieval task storing all of the primary keys in an internal list of primary keys;

the parallel batch processor creating a parallel batch record retrieval task to remove a batch, comprising a first plurality of primary keys, from the internal list of primary keys;

sending, by the parallel batch processor, multiple queries, in parallel, to retrieve a batch of data records from the remote database, the batch of data records corresponding to each primary key of the first plurality of primary keys;

in response to the multiple queries, receiving, by the parallel batch processor, the batch of data records from the remote database;

receiving, by the parallel batch processor, a request from the client program for a next data record;

in response to the request, removing, by the parallel batch processor, the next data record from the list of records; and contemporaneously with adding the batch of data records to the list of records, providing, by the parallel batch processor, the next data record from the parallel batch processor to the client program.

15. The method of claim 14, wherein each primary key corresponds to a unique data record.

16. The method of claim 14, further comprising: adding the retrieved data records to a list of records for access by the client program.

17. The method of claim 14, wherein the parallel batch processor is defined by one or more programming infrastructure libraries that allows the client program to request each data record of the plurality of data records one at a time.

18. The method of claim 14, wherein the parallel batch record retrieval task removes additional batches, comprising additional pluralities of primary keys, from the internal list of primary keys until all of the primary keys have been removed.

19. The method of claim 14, wherein a size of the batch is predetermined by the remote database.

20. The method of claim 14, wherein the remote database is a distributed database system.

* * * * *